United States Patent
Li

(10) Patent No.: US 9,898,804 B2
(45) Date of Patent: Feb. 20, 2018

(54) DISPLAY DRIVER APPARATUS AND METHOD OF DRIVING DISPLAY

(71) Applicant: SAMSUNG ELECTRONICS CO., LTD., Suwon-si (KR)

(72) Inventor: Feijuan Li, Hangzhou (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 129 days.

(21) Appl. No.: 14/801,236

(22) Filed: Jul. 16, 2015

(65) Prior Publication Data

US 2016/0019861 A1    Jan. 21, 2016

(30) Foreign Application Priority Data

Jul. 16, 2014  (CN) .......................... 2014 1 0338745
Jun. 2, 2015  (KR) ........................ 10-2015-0078252

(51) Int. Cl.
| | |
|---|---|
| *G06T 15/00* | (2011.01) |
| *G06T 3/60* | (2006.01) |
| *G06F 3/14* | (2006.01) |
| *G09G 5/36* | (2006.01) |
| *G06K 9/00* | (2006.01) |
| *G09G 3/00* | (2006.01) |
| *G09G 5/14* | (2006.01) |

(52) U.S. Cl.
CPC .............. *G06T 3/606* (2013.01); *G06F 3/14* (2013.01); *G06K 9/00986* (2013.01); *G09G 5/363* (2013.01); *G06T 2219/2016* (2013.01); *G09G 3/003* (2013.01); *G09G 5/14* (2013.01); *G09G 2330/021* (2013.01); *G09G 2340/0407* (2013.01); *G09G 2340/10* (2013.01); *G09G 2360/02* (2013.01); *G09G 2360/06* (2013.01); *G09G 2360/08* (2013.01)

(58) Field of Classification Search
CPC ................................ G06T 19/00; G06F 3/048
See application file for complete search history.

(56) References Cited

U.S. PATENT DOCUMENTS 6,753,863 B1 * 6/2004 Winkler .................. H04L 67/38
                                                         345/473
6,885,408 B2    4/2005 Hirano
(Continued)

FOREIGN PATENT DOCUMENTS

| CN | 1344110 A | 4/2002 |
|---|---|---|
| CN | 1441940 A | 9/2003 |

(Continued)

OTHER PUBLICATIONS

Communication dated Oct. 8, 2016, issued by the State Intellectual Property Office of P.R. China in counterpart Chinese application No. 201410338745.9.

*Primary Examiner* — Phi Hoang

(74) *Attorney, Agent, or Firm* — Sughrue Mion, PLLC

(57) ABSTRACT

Provided is a method of driving a display. The method includes receiving a plurality of pieces of layer data and classifying the received plurality of pieces of layer data into at least one of two-dimensional (2D) layer data, three-dimensional (3D) layer data, and direct mixed layer data, processing the 2D layer data, mixing the 3D layer data, and mixing the direct mixed layer data, the processed 2D layer data, the processed 3D layer data to generate a display interface.

11 Claims, 9 Drawing Sheets

(56) References Cited

U.S. PATENT DOCUMENTS

| | | | |
|---|---|---|---|
| 7,446,773 B1* | 11/2008 | Alben | G06F 9/4893 |
| | | | 345/501 |
| 8,189,918 B2 | 5/2012 | Jung et al. | |
| 8,553,152 B2 | 10/2013 | Yoon | |
| 2002/0080141 A1 | 6/2002 | Imai et al. | |
| 2005/0012753 A1 | 1/2005 | Karlov | |
| 2005/0041031 A1* | 2/2005 | Diard | G06T 15/005 |
| | | | 345/505 |
| 2007/0222798 A1 | 9/2007 | Kuno | |
| 2008/0284798 A1 | 11/2008 | Weybrew et al. | |
| 2011/0157474 A1 | 6/2011 | Nagata | |
| 2011/0292060 A1 | 12/2011 | Chambers et al. | |
| 2012/0011468 A1* | 1/2012 | Zhang | H04N 21/4431 |
| | | | 715/788 |
| 2012/0236012 A1 | 9/2012 | Wang | |
| 2012/0269267 A1* | 10/2012 | Choi | H04N 19/597 |
| | | | 375/240.13 |
| 2013/0083024 A1* | 4/2013 | Li | H04N 13/007 |
| | | | 345/426 |
| 2013/0187907 A1 | 7/2013 | Someya | |
| 2013/0198634 A1* | 8/2013 | Matas | G06T 11/60 |
| | | | 715/717 |

FOREIGN PATENT DOCUMENTS

| | | |
|---|---|---|
| CN | 101042854 A | 9/2007 |
| CN | 103024318 A | 4/2013 |
| CN | 103220541 A | 7/2013 |
| JP | 2011-107414 A | 6/2011 |
| KR | 10-2010-0060794 A | 6/2010 |
| TW | 200901081 A | 1/2009 |

* cited by examiner

DISPLAY DRIVER APPARATUS AND METHOD OF DRIVING DISPLAY

CROSS-REFERENCE TO RELATED APPLICATIONS

This application claims the benefit of State Intellectual Property Office (SIPO) of the People's Republic of China No. 201410338745.9, filed on Jul. 16, 2014, in State Intellectual Property Office (SIPO) of the People's Republic of China and Korean Patent Application No. 10-2015-0078252, filed on Jun. 2, 2015, in the Korean Intellectual Property Office, the disclosures of which are incorporated herein in their entirety by reference.

BACKGROUND

1. Field

Apparatuses and methods consistent with exemplary embodiments relate to a display driver apparatus and a method of driving a display, and more particularly, to a display driver apparatus configured to provide a display interface of an electronic terminal and a method of driving a display.

2. Related Art

With the development of information technology, various electronic terminals such as mobile phone terminals, smart TVs, personal computers (PCs), tablet PCs, game consoles, personal digital assistants, and digital multimedia players, have become essential to modern life. When the electronic terminals are used, people may usually communicate with the electronic terminals through display interfaces of the electronic terminals or see contents provided by the electronic terminals.

A display interface of an electronic terminal may be generated based on a plurality of pieces of layer data. For example, various apparatuses configured to process layer data of the electronic terminals may perform processing operations, such as a scaling operation, a color format conversion operation, and a mixing operation on the layer data and generate the display interface. That is, to transmit various pieces of information through a display apparatus, research has continuously been conducted on a technique of mixing layer data regarding a plurality of layers and outputting one frame.

SUMMARY

One or more exemplary embodiments provide a display driver apparatus and a method of driving a display, which may classify layer data and process the layer data to efficiently use a memory for a display device.

According to an aspect of an exemplary embodiment, there is provided a display driver apparatus including a classifier configured to receive a plurality of pieces of layer data and classify the received plurality of pieces of layer data into at least one from among two-dimensional (2D) layer data, three-dimensional (3D) layer data, and direct mixed layer data, a 2D graphic processor configured to process the 2D layer data, a 3D graphic processor configured to process the 3D layer data, and a display controller configured to mix the direct mixed layer data, the processed 2D layer data, and the processed 3D layer data to generate a display interface.

The classifier may classify the received plurality of pieces of layer data into the 2D layer data, the 3D layer data, and the direct mixed layer data according to characteristics of the received plurality of pieces of layer data.

Based on the characteristics of the received plurality of pieces of layer data, the classifier may classify layer data processed by the 2D graphic processor, from among the received plurality of pieces of layer data, as the 2D layer data, and classify layer data processed by the 3D graphic processor, from among the received plurality of pieces of layer data, as the 3D layer data.

Based on indication information included in the received plurality of pieces of layer data and characteristics of the received plurality of pieces of layer data, the classifier may classify the received plurality of pieces of layer data into at least one of the 2D layer data, the 3D layer data, and the direct mixed layer data.

The layer data from among the received plurality of pieces of layer including the indication information may be classified as the 3D layer data by the classifier.

The 2D layer data may include video layer data, and at least one from among a color format conversion operation, a scaling operation, a rotation operation, and a cropping operation may be performed on the video layer data by the 2D graphic processor.

The 3D layer data may be layer data that is not directly mixed by the display controller from among the received plurality of pieces of layer data other than the 2D layer data.

The classifier may not classify layer data corresponding to at least one from among layer data including a color format that is not supported by the display controller, layer data including data in which the number of pieces of data superposed in a same pixel exceeds a reference value, layer data having such a data size as not to be processed by the display controller, and layer data that is not mixed due to performance of the display controller, as the direct mixed layer data.

The classifier may determine whether layer data that is classifiable as the direct mixed layer data, is present in the received plurality of pieces of layer data. In response to the classifier determining that the layer data that is classifiable as the direct mixed layer data is present, the classifier may classify the received plurality of pieces of layer data into at least one from among the 2D layer data, the 3D layer data, and the direct mixed layer data. In response to the classifier determining that the layer data that is classifiable as the direct mixed layer data is not present, the classifier may classify the received plurality of pieces of layer data into at least one from among the 2D layer data and the 3D layer data.

According to an aspect of another exemplary embodiment, there is provided a method of driving a display. The method includes: receiving a plurality of pieces of layer data and classifying the received plurality of pieces of layer data into at least one from among 2D layer data, 3D layer data, and direct mixed layer data; processing the 2D layer data; mixing the 3D layer data; and mixing the direct mixed layer data, the processed 2D layer data, and the processed 3D layer data to generate a display interface.

The classifying of the received plurality of pieces of layer data may include determining whether layer data that is classifiable as the direct mixed layer data is present in the received plurality of pieces of layer data. In response to determining that the layer data that is classifiable as the direct mixed layer data is present, the received plurality of pieces of layer data may be classified into at least one from among the 2D layer data, the 3D layer data, and the direct mixed layer data, and, in response to determining that the layer data that is classifiable as the direct mixed layer data is not present, the received plurality of pieces of layer data may be classified into at least one from among the 2D layer data and the 3D layer data. According to an aspect of another exemplary embodiment, there is provided a method of driving a display by using a display driver apparatus including a classifier configured to receive a plurality of pieces of layer data and classify the plurality of pieces of layer data, a 2D graphic processor configured to process the classified layer data, a 3D graphic processor configured to mix the classified layer data, and a display controller configured to generate a display interface. The method includes classifying the received plurality of pieces of layer data into at least one from among 2D layer data, 3D layer data, and direct mixed layer data, and generating the display interface based on the classified 2D layer data, the classified 3D layer data, and the classified direct mixed layer data.

The generation of the display interface may include processing the classified 2D layer data, processing the classified 3D layer data, and mixing the processed 2D layer data, the processed 3D layer data, and the direct mixed layer data.

The classification of the received plurality of pieces of layer data may include classifying the received plurality of pieces of layer data based on respective characteristics of the received plurality of pieces of layer data.

The generation of the display interface may include transmitting the classified direct mixed layer data to the display controller, transmitting the classified 2D layer data to the 2D graphic processor, and transmitting the classified 3D layer data to the 3D graphic processor.

The display driver apparatus may further include a first buffer unit and a second buffer unit. The generation of the display interface may include storing the 2D layer data processed by the 2D graphic processor in the first buffer unit, storing the 3D layer data mixed by the 3D graphic processor in the second buffer unit, receiving, by the display controller, the 2D layer data processed by the first buffer unit, receiving, by the display controller, the 3D layer data mixed by the second buffer unit, and mixing, by the display controller, the direct mixed layer data, the processed 2D layer data, and the mixed 3D layer data.

According to an aspect of another exemplary embodiment, there is provided a display apparatus. The display driver apparatus includes: a classifier configured to classify a plurality of pieces of layer data into at least one from among two-dimensional (2D) layer data, three-dimensional (3D) layer data, and direct mixed layer data; a 2D graphic processor configured to process layer data from among the plurality of pieces of layer data that is classified as the 2D layer data and to output processed 2D layer data; a 3D graphic processor configured to process layer data from among the plurality of pieces of layer data that is classified as the 3D layer data and to output processed 3D layer data; and a display controller configured to mix the direct mixed layer data, the processed 2D layer data, and the processed 3D layer data to generate a display interface.

The 2D layer data may include video layer data, and the 2D graphic processor may perform at least one from among a color format conversion operation, a scaling operation, a rotation operation, and a cropping operation on the video layer data.

The classifier may determine whether layer data that is classifiable as the direct mixed layer data, is present in the received plurality of pieces of layer data, and, in response to the classifier determining that the layer data that is classifiable as the direct mixed layer data is present, the classifier may classify the received plurality of pieces of layer data into at least one from among the 2D layer data, the 3D layer data, and the direct mixed layer data, and, in response to the classifier determining that the layer data that is classifiable as the direct mixed layer data is not present, the classifier may classify the received plurality of pieces of layer data into at least one from among the 2D layer data and the 3D layer data.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EXEMPLARY EMBODIMENTS

Figure 1:
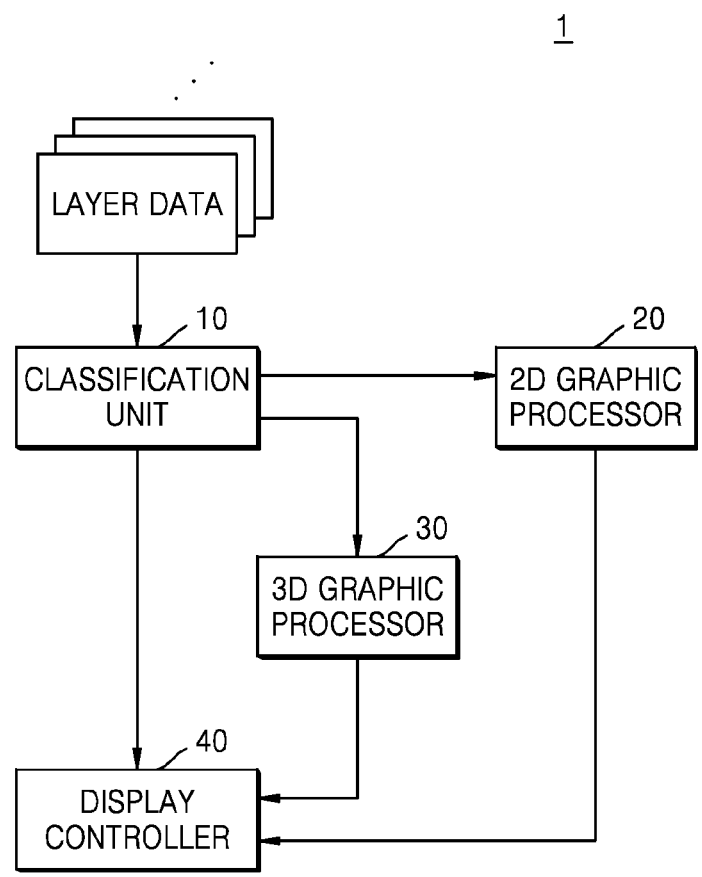
FIG. 1 is a block diagram of a display driver apparatus according to an exemplary embodiment.

As used herein, the term "and/or" includes any and all combinations of one or more of the associated listed items. Expressions such as "at least one of," when preceding a list of elements, modify the entire list of elements and do not modify the individual elements of the list.

The inventive concept will now be described more fully hereinafter with reference to the accompanying drawings, in which exemplary embodiments of the inventive concept are shown. These embodiments are provided so that this disclosure is thorough and complete and fully conveys the scope of the inventive concept to one skilled in the art. Accordingly, while the inventive concept can be modified in various ways and take on various alternative forms, specific embodiments thereof are shown in the drawings and described in detail below as examples. There is no intent to limit the inventive concept to the particular forms disclosed. On the contrary, the inventive concept is to cover all modifications, equivalents, and alternatives falling within the spirit and scope of the appended claims. Like reference numerals refer to like elements throughout. In the drawings, the thicknesses of layers and regions may be exaggerated for clarity.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the inventive concept.

Unless otherwise defined, all terms (including technical and scientific terms) used herein are to be interpreted as is customary in the art to which this inventive concept belongs. It will be further understood that terms in common usage should also be interpreted as is customary in the relevant art and not in an idealized or overly formal sense unless explicitly so defined herein.

FIG. 1 is a block diagram of a display driver apparatus 1 according to an exemplary embodiment.

Referring to FIG. 1, the display driver apparatus 1 may include a classification unit 10 (e.g., a classifier, etc.), a 2D graphic processor 20, a 3D graphic processor 30, and a display controller 40. The classification unit 10, the 2D graphic processor 20, and the 3D graphic processor 30 may be embodied by at least one of a general-purpose hardware processor (e.g., a digital signal processor (DSP) or a field programmable gate array (FPGA)), a special-purpose hardware processor (e.g., a dedicated chip), and a computer program (e.g., software). The display driver apparatus 1 may be included in an electronic terminal may provide a display interface to a user. The electronic terminal may be an electronic device capable of providing a personal computer (PC), a mobile phone terminal, a smart TV, a tablet PC, a game console, a personal digital assistant (PDA), a digital multimedia player, or a display interface.

The classification unit 10 may classify the received layer data into at least one of 2D layer data, 3D layer data, and direct mixed layer data to receive layer data and generate a display interface. In an exemplary embodiment, the display interface may include a display for showing the layer data to users and include an interface for a human-machine interaction (HMI) or an interface for providing contents provided by the electronic terminal to a user. Hereinafter, the display interface may include, for example, a display processed to visually show the layer data to users or users' inputs, which are received and processed by the electronic terminal. The display driver apparatus 1 may generate the display interface based on the layer data. In an exemplary embodiment, the layer data may be generated by at least one of a general-purpose hardware processor (e.g., a DSP or an FPGA), a special-purpose hardware processor (e.g., a dedicated chip), and a computer program (e.g., software). The display interface may be generated by performing a processing operation, such as a scaling operation, a color format conversion operation, and a mixing operation, on the layer data.

The classification unit 10 according to an exemplary embodiment may classify the received layer data based on information regarding the received layer data. The classification unit 10 may classify the layer data based on a processing operation on the received layer data. Furthermore, the classification unit 10 may classify the received layer data based on display efficiency or power consumption caused by the processing operation.

The classification unit 10 may appropriately classify a plurality of pieces of layer data based on at least one of the above-described classification standards. Thus, an optimized processing operation may be performed on the classified layer data.

In an exemplary embodiment, the classification unit 10 may classify the plurality of pieces of layer data in at least one of the 2D layer data, the 3D layer data, and the direct mixed layer data according to characteristics of each of the plurality of pieces of layer data. The characteristics of the layer data may include characteristics that are related to the processing of the layer data. For example, the classification unit 10 may classify layer data, which is processable by the 2D graphic processor 20, as 2D layer data and classify layer data, which is mixable by the 3D graphic processor 30, as 3D layer data according to the characteristics of the layer data. The classification unit 10 may classify layer data, which remains unclassified, as direct mixed layer data.

The classification unit 10 may transmit the classified 2D layer data to the 2D graphic processor 20, transmit the classified 3D layer data to the 3D graphic processor 30, and transmit the classified direct mixed layer data to the display controller 40.

The direct mixed layer data may refer to layer data directly mixed by the display controller 40. The direct mixed layer data may not be mixed with other layer data by the 3D graphic processor 30 but may be transmitted to the display controller 40. The display controller 40 may perform a direct mixing operation on the direct mixed layer data to indicate that the display controller 40 may mix the direct mixed layer data, layer data processed by the 2D graphic processor 20, and layer data processed by the 3D graphic processor 30.

The 2D graphic processor 20 may process the classified 2D layer data. In an exemplary embodiment, the 2D layer data may include video layer data. Here, the video layer data may include layer data that may be generated during reproduction of various video files, such as moving pictures. In an exemplary embodiment, the 2D graphic processor 20 may perform a processing operation, such as a cropping operation, a rotation operation, a scaling operation, or a color format conversion operation, on video layer data. The color format may be used to divide the kinds of colors according to color coordinates, and include red-green-blue (RGB), cyan-magenta-yellow (CMY), hue-saturation-intensity (HSI), and YCbCr. The cropping operation may be an operation of displaying only a cut portion of the entire image.

The 3D graphic processor 30 may process the classified 3D layer data. In an exemplary embodiment, the processing operation may be an operation of processing 3D graphics. The processing operation may be an operation of expressing a space based on depth information regarding 2D graphics included in the layer data to embody the 3D graphics. In an exemplary embodiment, the processing operation may also include an operation of mixing the classified 3D layer data. For example, the processing operation may include a typical blending operation, an alpha blending operation, a shading operation, and/or a mapping operation. Furthermore, the 3D graphic processor 30 may perform a processing operation including an operation of mixing the classified 3D layer data and the above-described color format conversion, cropping, and scaling operations.

The 3D layer data may include layer data, which is not directly mixable by the display controller 30, from among layer data except 2D layer data. For example, layer data that is directly mixed by the display controller 40 may depend on processing performance of the display controller 40. In this case, layer data that is not directly mixable by the display controller 40 may be classified as the 3D layer data. For example, the layer data that is not directly mixable by the display controller 40 may include at least one of layer data having a color format that cannot be supported by the display controller 40, layer data regarding layers exceeding the maximum number of superposed layers that are processable by the display controller 40, and layer data exceeding a predetermined data size that is processable by the display controller 40.

In an exemplary embodiment, the received layer data may be layer data having a color format that cannot be supported by the display controller 40. In this case, the classification unit 10 may classify layer data, which is mixable by the 3D graphic processor 30 but has a color format that cannot be supported by the display controller 40, as 3D layer data.

In another exemplary embodiment, the received layer data may exceed a size of layer data that is processable by the display controller 40. In this case, the classification unit 10 may classify layer data, which does not correspond to the size of the layer data that is processable by the display controller 50, as 3D layer data that is mixable by the 3D graphic processor 30. That is, when the received layer data is not of such a size as to be processed by the display controller 40, the classified unit 10 may classify the layer data as 3D layer data is mixable by the 3D graphic processor 30.

According to another exemplary embodiment, the layer data may exceed the maximum number of superposition layers that are processable by the display controller 40. For example, when layer data regarding five layers or fewer are simultaneously mixable by the display controller 40, the classification unit 10 may classify layer data regarding layers exceeding a layer reference number (i.e., 5) as 3D layer data to be mixed by the 3D graphic processor 30.

As described above, layer data that is not directly mixable by the display controller 40 may be classified according to the color format, size, or maximum layer number of the received layer data, but the inventive concept is not limited to this embodiment. For example, the receive layer data may be classified as layer data that is not directly mixable by the display controller 40 based on performance of the display controller 40.

According to another exemplary embodiment, the classification unit 10 may classify a plurality of pieces of layer data into at least one of 2D layer data, 3D layer data, and direct mixed layer data according to characteristics of layer data related to the received layer data and indication information used to designate layer data mixed by the 3D graphic processor 30. The indication information used to designate the layer data mixed by the 3D graphic processor 30 may be included in the received layer data. In an example, the classification unit 10 may classify the layer data as 3D layer data based on the indication information included in the received layer data to designate the layer data to be mixed by the 3D graphic processor. For example, initially, the classification unit 10 may determine whether there is layer data including the indication information used to designate the layer data to be mixed by the 3D graphic processor 30, in the received layer data. The layer data including the indication information may be classified as 3D layer data. The classification unit 10 may classify layer data suitable for being processed by the 2D graphic processor 20 as 2D layer data and classify layer data suitable for being mixed by the 3D graphic processor 30 as 3D layer data based on characteristics of layer data that remains unclassified. Thereafter, the classification unit 10 may classify layer data, which remains unclassified during the above-described classification operation, as direct mixed layer data. The layer data suitable for being processed by the 2D graphic processor 20 and the layer data suitable for being processed by the 3D graphic processor 30 are similar to those described above, and detailed descriptions thereof are omitted.

In another exemplary embodiment, the classification unit 10 may determine whether there is layer data suitable to be classified as direct mixed layer data and directly mixed by the display controller 40 to reduce power consumption of the electronic terminal or achieve the object of a bandwidth saving system of the electronic terminal. When part of the layer data may be directly mixed by the display controller 40, the amount of layer data to be mixed by the 3D graphic processor 30 may be distributed between the 3D graphic processor 30 and the display controller 40. Thus, the layer data may be efficiently mixed. However, a consideration portion of system bandwidth of the electronic terminal may be needed to transmit the direct mixed layer data classified by the classification unit 10 to the display controller 40. Thus, the display controller 40 may consume a large amount of power to perform an operation of mixing the classified direct mixed layer data, the 2D layer data processed by the second graphic processor 20, and the 3D layer data processed by the third graphic processor 30. Therefore, in at least one of a case in which only a small amount of layer data is mixed by the 3D graphic processor 30 (e.g., when there is no operation performed by a user or when a screen of the display interface is unchanged) and a case in which a bandwidth required to transmit layer data, which may be classified as the direct mixed layer data, to the display controller 40 is a reference value or more, the classification unit 10 may not classify the layer data as the direct mixed layer data during the classification operation.

In an exemplary embodiment, the classification unit 10 may determine whether a frequency of the layer data received by the display controller 40 is lower than a predetermined frequency reference value. Based on the determination result, the classification unit 10 may choose to classify the layer data into 2D layer data and 3D layer data or choose to classify the layer data into 2D layer data, 3D layer data, and direct mixed layer data.

Layer data may be provided to the display controller 40 at a specific clock frequency by a front-end device of the display controller 40. A frequency of the layer data received by the display controller 40 may indicate the frequency of interactions between a current user and the electronic terminal. As the frequency of the layer data received by the display controller 40 increases, it may mean that interactions between the current user and the electronic terminal occur more frequently. For example, when the frequency of the layer data received by the display controller 40 is lower than the frequency reference value, the classification unit 10 may classify the layer data into 2D layer data and 3D layer data. In another exemplary embodiment, when the frequency of the layer data received by the display controller 40 is higher than a predetermined frequency reference value, the classification unit 10 may classify the layer data into 2D layer data, 3D layer data, and direct mixed layer data.

As described above, when the frequency of the layer data received by the display controller 40 is lower than the frequency reference value, direct mixed layer data that may be transmitted from the classification unit 10 may not be separately classified so that the display controller 40 may perform a direct mixing operation. As a result, power consumption caused by the user of a system bandwidth may be reduced during the transmission of the direct mixed layer data. When the frequency of the layer data received by the splay controller 40 is higher than the frequency reference value, the display controller 40 may perform an operation of directly mixing the direct mixed layer data with other layer data processed by the 2D graphic processor 20 and 3D graphic processor 30. Thus, an efficient operation of mixing the layer data may be performed by distributing the amount of layer data mixed by the 3D graphic processor 30. The display controller 40 may not perform an operation of mixing layer data, while the 3D graphic processor 30 may perform an operation of mixing 3D layer data.

The classification unit 10 may determine whether a resolution of an image corresponding to layer data that is directly mixable by the display controller 40 exceeds a predetermined resolution reference value. The resolution of the image corresponding to the layer data may refer to a resolution of a frame image generated by mixing the layer data. Based on the determination result, the classification unit 10 may choose to classify layer data into 2D layer data and 3D layer data or choose to classify layer data into 2D layer data, 3D layer data, and direct mixed layer data.

When a resolution of the image corresponding to the layer data that is directly mixable by the display controller 40 exceeds a resolution reference value, a consideration portion of system bandwidth may be needed to transmit the directly mixable layer data to the display controller 40. Accordingly, in an exemplary embodiment, when the resolution of the image corresponding to the layer data that is classifiable as direct mixed layer data exceeds a predetermined resolution reference value, the classification unit 10 may classify the layer data into 2D layer data and 3D layer data. In another exemplary embodiment, when the resolution of the image corresponding to the layer data that is mixable by the display controller 40 does not exceeds the predetermined resolution reference value, the classification unit 10 may classify the layer data into 2D layer data, 3D layer data, and direct mixed layer data. Thus, when the resolution of the image corresponding to the layer data that is classifiable as direct mixed layer data exceeds a resolution reference value, the classification unit 10 may not classify the layer data as the direct mixed layer data. As described above, power consumption caused by the use of a system bandwidth of an electronic terminal may be reduced during the transmission of the direct mixed layer data.

In addition, when the resolution of the image corresponding to the layer data that is classifiable as the direct mixed layer data does not exceed the resolution reference value, the classification unit 10 may classify the layer data as the direct mixed layer data and transmit the direct mixed layer data to the display controller 40. The display controller 40 may directly mix the direct mixed layer data and other layer data processed by the 2D graphic processor 20 and the 3D graphic processor 30. Thus, an efficient operation of mixing layer data may be performed by distributing the amount of layer data mixed by the 3D graphic processor 30.

Figure 2:
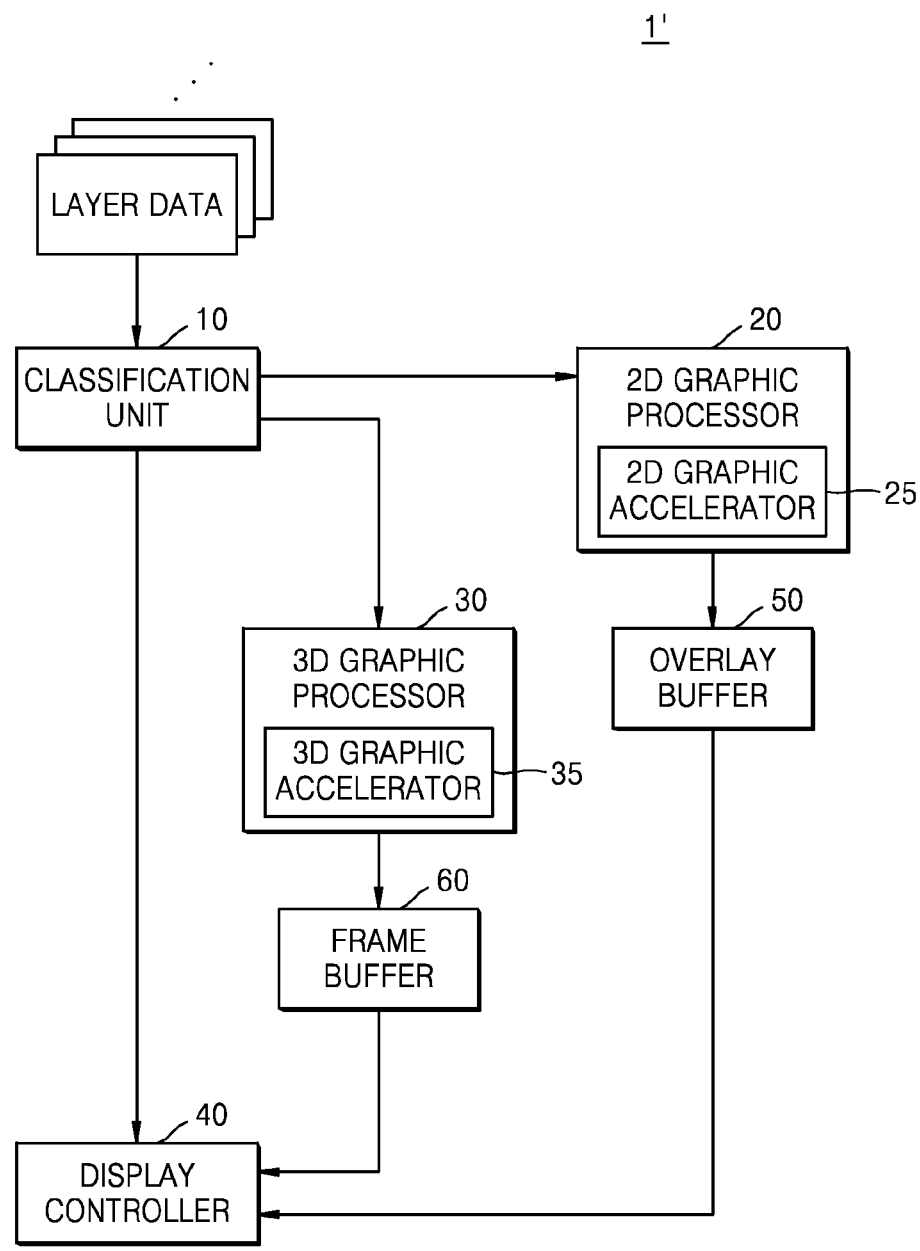
FIG. 2 is a block diagram of a display driver apparatus configured to generate a display interface, according to another exemplary embodiment.

FIG. 2 is a block diagram of a display driver apparatus 1' configured to generate a display interface, according to another exemplary embodiment.

Referring to FIG. 2, the display driver apparatus 1' may include a classification unit 10, a 2D graphic processor 20, a 3D graphic processor 30, a display controller 40, an overlay buffer 50, and a frame buffer 60. Since configurations of the classification unit 10, the 2D graphic processor 20, the 3D graphic processor 30, and the display controller 40 are the same as those of FIG. 1, differences between the display driver apparatus 1 of FIG. 1 and the display driver apparatus 1' of FIG. 2 will chiefly be described.

The 2D graphic processor 20 may process classified 2D layer data. The processing of the classified 2D layer data by using the 2D graphic processor 20 may include performing at least one of a color format conversion operation (e.g., conversion of an RGB color space into a YCrCb color space), a scaling (upscaling or downscaling) operation, a rotation operation, and a cropping operation on the classified 2D layer data. Thereafter, the 2D graphic processor 20 may store the processed layer data in the overlay buffer 50. The 2D graphic processor 20 may include a typical 2D graphic accelerator 25 or a typical scaler (not shown).

The 3D graphic processor 30 may mix classified 3D layer data. As described above, in an exemplary embodiment, the 3D graphic processor 30 may mix layer data, which is not directly mixable by the display controller 40. The 3D graphic processor 30 may mix a plurality of pieces of layer data to generate layer data regarding one layer. In addition, the 3D graphic processor 30 may store the layer data regarding one layer, which is generated due to the mixing operation, in the frame buffer 60. Furthermore, the 3D graphic processor 30 may include a typical 3D graphic accelerator 35.

The display controller 40 may receive direct mixed layer data from the classification unit 10, receive 2D layer data processed by the overlay buffer 50, and receive 3D layer data mixed by the frame buffer 60. However, in an exemplary embodiment, when the classification unit 10 classifies a plurality of pieces of layer data into only 2D layer data and 3D layer data, the display controller 40 may receive the 2D layer data processed by the overlay buffer 50 and the 3D layer data received from the frame buffer 60.

The display controller 40 may mix direct mixed layer data, the processed 2D layer data, and the mixed 3D layer data to generate the display interface. Specifically, the display controller 40 may mix the 2D layer data processed by the 2D graphic processor 20, the 3D layer data mixed by the 3D graphic processor 30, and the direct mixed layer data obtained by the classification unit 10. Furthermore, the direct mixed layer data may be previously processed during the mixing operation. For example, a processing operation (e.g., a downscaling or upscaling operation) corresponding to processing performance of the display controller 40 may be previously performed on the direct mixed layer data. In the above-described method, the display controller 40 may mix a plurality of pieces of layer data to generate layer data regarding one layer. The generated display interface may be output on a screen of the electronic terminal. In an example, the display controller 40 may be embodied by a display adaptor. The display controller 40 may correspond to a fully interactive mobile display (FIMD).

According to an exemplary embodiment, layer data may be appropriately classified by using a display driver apparatus to generate the display interface of the electronic terminal. Thus, performance of various apparatuses for processing layer data may be sufficiently utilized, and display efficiency may be improved.

Figure 3:
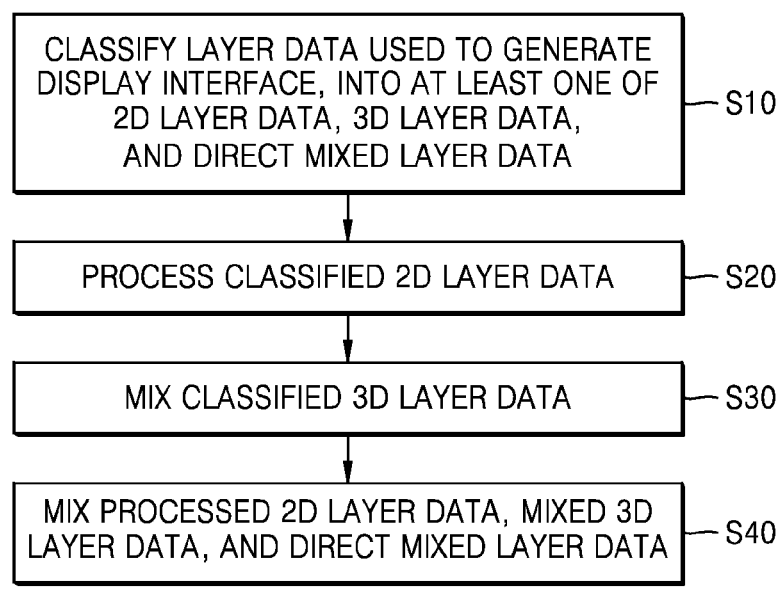
FIG. 3 is a flowchart of a method of driving a display to generate a display interface of an electronic terminal, according to an exemplary embodiment.

FIG. 3 is a flowchart of a method of driving a display to generate a display interface of an electronic terminal, according to an exemplary embodiment.

Referring to FIG. 3, layer data used to generate a display interface may be classified into at least one of 2D layer data, 3D layer data, and direct mixed layer data (operation S10). The display interface may include an interface for an HMI provided from an electronic terminal or an interface for providing contents to a user. Here, the layer data may be used to generate the display interface. The display interface may be generated by performing a scaling operation, a color format conversion operation, and a layer data mixing operation on layer data.

According to an exemplary embodiment, layer data may be classified based on information related to layer data. Alternatively, the layer data may be classified in consideration of performance of an apparatus for performing an appropriate processing operation on the layer data. Furthermore, a method of classifying layer data may be selected in consideration of display efficiency or power consumption. Thus, layer data may be appropriately classified, and an optimum processing operation may be performed on the layer data.

The layer data may be classified into at least one of 2D layer data, 3D layer data, and direct mixed layer data according to characteristics thereof (operation S10). Here, the characteristics of the layer data may include characteristics related to performance of a device for processing the layer data. For example, from among the layer data, layer data processed by the 2D graphic processor may be classified as 2D layer data, and layer data mixed by the 3D graphic processor may be classified as 3D layer data. Further, layer data, which remains unclassified, may be classified as direct mixed layer data.

In other exemplary embodiments, layer data processed by the 2D graphic processor may be classified as 2D layer data, layer data mixed by the 3D graphic processor may be classified as 3D layer data, and layer data, which is not directly mixable by a display controller, may be classified as 3D layer data.

In other exemplary embodiments, the layer data may be classified into at least one of 2D layer data, 3D layer data, and direct mixed layer data according to indication information for designating the layer data mixed by the 3D graphic processor and the characteristics of layer data (operation S10). The indication information may be required to indicate layer data processed by the 3D graphic processor. In addition, layer data including indication information may be classified as 3D layer data.

In an exemplary embodiment, initially, it may be determined whether the layer data includes indication information for indicating the layer data mixed by the 3D graphic processor. When the layer data includes the indication information, the layer data may be classified as 3D layer data. Next, based on characteristics of layer data that remains unclassified, layer data that is processable by the 2D graphic processor may be classified as 2D layer data, and layer data that is mixable by the 3D graphic processor may be classified as 3D layer data. Unclassified layer data may be classified as direct mixed layer data.

For example, video layer data may be classified as 2D layer data that is processable by the 2D graphic processor, and layer data that is not directly mixable by the display controller may be classified as 3D layer data and mixed by the 3D graphic processor. Alternatively, layer data except the 2D layer data and the 3D layer data may be classified as direct mixed layer data. Since layer data, which is processable by the 2D graphic processor, and layer data, which is mixable by the 3D graphic processor, have been described above, detailed descriptions thereof are omitted.

The 2D graphic processor may process the classified 2D layer data (operation S20). During a process of processing the 2D layer data, at least one of a color format conversion process, a scaling operation, a rotation operation, and a cropping operation may be performed on the 2D layer data. Layer data processed by the 2D graphic processor may be stored in an overlay layer buffer. During a process of processing the 2D layer data, a 2D graphic accelerator or a typical scaler may be used to process the 2D layer data.

The 3D graphic processor may mix the classified 3D layer data (operation S30). In an exemplary embodiment, the 3D graphic processor may mix layer data, which is not directly mixable by the display controller. For example, the 3D graphic processor may mix layer data regarding a plurality of layers and generate layer data regarding one layer. The generated layer data regarding the one layer may be stored in a frame buffer. During this process, the 3D graphic accelerator may be used to mix the 3D layer data.

The display controller may mix direct mixed layer data, the processed 2D layer data, and the mixed 3D layer data to generate the display interface (operation S40). The display controller may mix layer data, which are processed by the 2D graphic processor and the 3D graphic processor, with classified direct mixed layer data. Furthermore, the direct mixed layer data may be previously processed during the mixing operation. In an example, the display controller may previously perform a processing operation, such as a downscaling or upscaling operation, on the direct mixed layer data. As described above, the display controller may mix a plurality of pieces of layer data to generate layer data regarding one layer. The display interface obtained by using the above-described method may be output on a screen of the electronic terminal. For example, a display adaptor (e.g., a video adaptor) may mix direct mixed layer data, the processed 2D layer data, and the mixed 3D layer data. An FIMD may mix direct mixed layer data, the processed 2D layer data, and the mixed 3D layer data.

Figure 4:
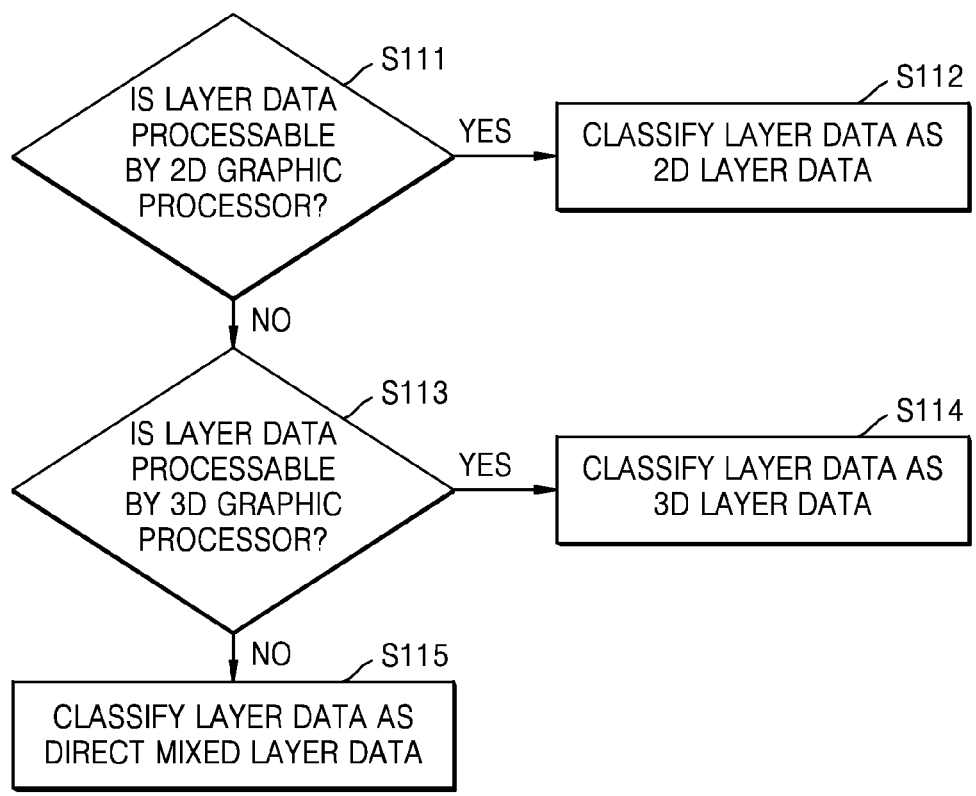
FIG. 4 is a flowchart of a method of classifying a plurality of pieces of layer data according to an exemplary embodiment.

FIG. 4 is a flowchart of a method of classifying a plurality of pieces of layer data according to an exemplary embodiment.

Referring to FIG. 4, it may be determined whether layer data is processable by a 2D graphic processor (operation S111). The layer data that is processable by the 2D graphic processor may include video layer data. Here, the video layer data may include layer data that is generated during reproduction of various video files, such as moving pictures. Thus, a color formation conversion operation, a scaling operation, a conversion operation, and/or a cropping operation may be performed on the video layer data based on processing performance of the 2D graphic processor. Accordingly, the video layer data may be determined as layer data that is processable by the 2D graphic processor.

If the layer data is determined as processable by the 2D graphic processor (refer to YES in operation S111), an operation of classifying the layer data as 2D layer data may be performed so that the 2D graphic processor may process the layer data (operation S112). Otherwise, if the operation layer data is determined as not processable by the 2D graphic processor (refer to NO in operation S111), it may be determined whether the layer data is mixable by the 3D graphic processor (operation S113). 3D layer data that is mixed by the 3D graphic processor may include layer data other than the 2D layer data, which is not directly mixable by a display controller. Therefore, the 3D graphic processor may be more capable of mixing layer data than the display controller. For example, layer data that is directly mixable by the display controller may depend on processing performance of the display controller, while layer data that is not directly mixable by the display controller may be determined as 3D layer data. The layer data that is not directly mixable by the display controller may include at least one of layer data having a color format that cannot be supported by the display controller, layer data including data in which the number of pieces of data superposed in the same pixel exceeds a reference value, layer data having a data size that is not processable by the display controller, and layer data that requires higher mixing performance than that of the display controller.

Specifically, the color format of the layer data may not be supported by the display controller. In other words, the display controller may not process layer data having a color format that cannot be supported by the display controller. Therefore, the layer data may be classified as layer data that is mixable by the 3D graphic processor. During an operation of superposing layer data, when the number of pieces of data superposed in the same pixel exceeds a reference value and the layer data includes the superposed pieces of data, the layer data may be classified as layer data that is mixable by the 3D graphic processor. Furthermore, layer data having a data size that is not processable by the display controller, based on the size of layer data that is processable by the display controller, may be classified as data that is mixable by the 3D graphic processor.

In an exemplary embodiment, layer data regarding five layers or fewer may be simultaneously mixed by the display controller. Layer data regarding layers exceeding a maximum number standard of layers may be classified as layer data that is mixable by the 3D graphic processor. However, the inventive concept is not limited thereto, and various kinds of pieces of layer data may be mixed by the display controller depending on performance of the display controller.

If the layer data is determined as mixable by the 3D graphic processor (refer to YES in operation S113), the layer data may be classified as 3D layer data so as to process the layer data by using the 3D graphic processor (operation S114).

Otherwise, if the layer data is determined as not mixable by the 3D graphic processor (refer to NO in operation S113), the layer data may be classified as direct mixed layer data so as to process the layer data by using the display controller (operation S115). However, the inventive concept is not limited to the above-described operations according to one exemplary embodiment, and may further include various operations. For example, in operation S113, it may be determined whether the layer data is directly mixable by the display controller. If the layer data is determined as directly mixable by the display controller, the layer data may be classified as direct mixed layer data so as to directly mix the layer data by using the display controller (operation S114). Otherwise, if the layer data is determined as not mixable by the display controller, the layer data may be classified as 3D graphic data so as to process the layer data by the 3D graphic processor (operation S115).

For example, the layer data that is directly mixable by the display controller may include at least one of layer data having a color format supported by the display controller, layer data including data in which the number of pieces of data superposed in the same pixel does not exceed a reference value, layer data having such a data size as to be supported by the display controller, and layer data that requires performance corresponding to mixing performance of the display controller. Specifically, the color format of the layer data may not be supported by the display controller. That is, the display controller may not process layer data having the color format that cannot be supported by the display controller. Therefore, the layer data may be classified as layer data that is mixable by the 3D graphic processor. In an operation of superposing layer data, the layer data including the data in which the number of pieces of data superposed in the same pixel does not exceed the reference value may be mixed by the display controller. Layer data having such a size as to be processed by the display controller may be classified as layer data that may be directly mixable by the display controller according to a size of the layer data that is mixable by the display controller. Here, a minimum width of the layer data may be equal to or more than 64 pixels. In an exemplary embodiment, layer data regarding five layers or fewer may be simultaneously mixed by the display controller. Layer data regarding layers of which the number does not exceed the maximum number standard of mixable layers may be classified as layer data that is directly mixable by the display controller.

Figure 5:
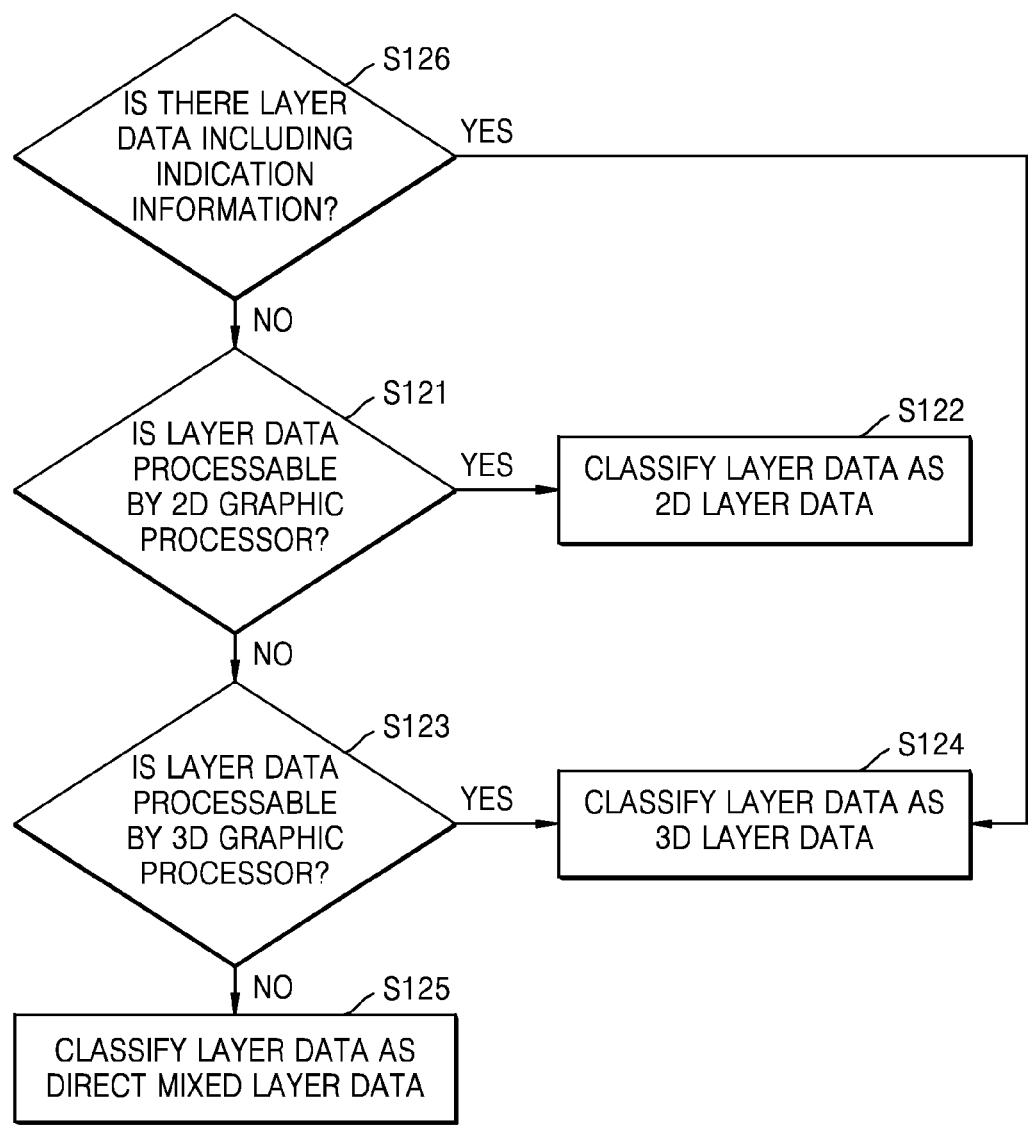
FIG. 5 is a flowchart of a method of classifying a plurality of pieces of layer data according to another exemplary embodiment.

FIG. 5 is a flowchart of a method of classifying a plurality of pieces of layer data according to another exemplary embodiment.

Referring to FIGS. 1 and 5, as described above with reference to FIG. 3, a plurality of pieces of layer data may be classified according to indication information for indicating 3D layer data mixed by a 3D graphic processor and characteristics of respective pieces of layer data.

It may be determined whether there is layer data including indication information for designating layer mixed by the 3D graphic processor (operation S126). When the layer data is mixable by the 3D graphic processor, the layer data may include indication information. If there is the layer data including the indication information (refer to YES in operation S126), the layer data including the indication information may be classified as 3D layer data (operation S124).

If there is not layer data including indication information (refer to NO in operation S126), it may be determined whether layer data is processable by a 2D graphic processor (operation S121). If the layer data is determined as processable by the 2D graphic processor (refer to YES in operation S121), the layer data may be classified as 2D layer data so as to process the layer data by using the 2D graphic processor (operation S122). Otherwise, if the layer data is determined as not processed by the 2D graphic processor (refer to NO in operation S121), the layer data may be classified as 3D layer data, and it may be determined whether the layer data is mixable by the 3D graphic processor (operation S123). Since the layer data that is mixable by the 3D graphic processor is described above, detailed descriptions thereof are omitted. If the layer data is determined as not mixable by the 3D graphic processor (refer to NO in operation S123), the layer data may be classified as direct mixed layer data so as to directly mix the layer data by using the display controller (operation S125).

Figure 6:
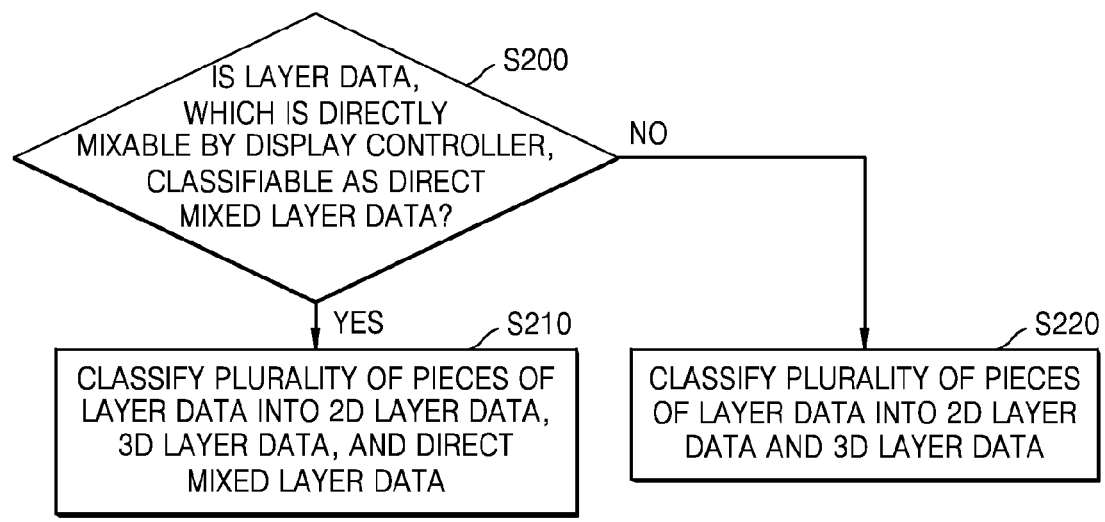
FIG. 6 is a flowchart of a method of determining categories of layer data to be classified during an operation of classifying the layer data according to an exemplary embodiment.

FIG. 6 is a flowchart of a method of determining categories of layer data to be classified during an operation of classifying the layer data according to an exemplary embodiment.

Referring to FIGS. 1 and 6, it may be determined whether layer data that is directly mixable by a display controller is classifiable as direct mixed layer data (operation S200). The direct mixed layer data that may be directly mixable by the display controller 40 may be classified by the classification unit 10 of FIG. 1. Thus, the display controller 40 may perform a mixing operation on the direct mixed layer data, thereby saving a system bandwidth and reducing power consumption of an electronic terminal. The classification unit 10 may transmit the direct mixed layer data, which part of layer data, to the display controller 40, and the display controller 40 may mix the direct mixed layer data with other layer data processed by the 2D graphic processor 20 and the 3D graphic processor 30. Thus, the amount of data to be mixed by the 3D graphic processor 30 may be distributed between the 3D graphic processor 30 and the display controller 40, thereby improving display efficiency.

However, while a consideration portion of system bandwidth of the electronic terminal is needed for the classification unit 10 to transmit layer data, which is classifiable as the direct mixed layer data, to the display controller 40, the display controller 40 may consume a consideration amount of power. Therefore, when a data processing amount of the 3D graphic processor 30 is small or when a consideration portion of system bandwidth of the electronic terminal is used to transmit layer data, which is classifiable as the direct mixed layer data, the display controller 40 may not perform an operation of directly mixing layer data. Except for the above-described cases, layer data that is classifiable as the direct mixed layer data may be classified as the direct mixed layer data, and the display controller 40 may directly mix the direct mixed layer data with layer data processed by the 2D graphic processor 20 and the 3D graphic processor 30. Accordingly, when layer data that is classifiable as the direct mixed layer data is transmitted to the display controller 40, the system bandwidth of the electronic terminal may be equal to or lower than a reference value or the data processing amount of the 3D graphic processor 30 may be equal to or higher than a reference value. In these cases, it may be determined that the display controller 40 may directly mix the layer data, which is classifiable as the direct mixed layer data, with the layer data processed by the 2D graphic processor 20 and the 3D graphic processor 30. Thus, the classification unit 10 may classify the layer data into 2D layer data, 3D layer data, and direct mixed layer data (operation S210). However, when layer data that is directly mixable by the display controller 40 is transmitted to the display controller 40, the system bandwidth of the electronic terminal may exceed a reference value or the data processing amount of the 3D graphic processor 30 may be lower than a reference value. In these cases, it may be determined that the display controller 40 cannot mix the direct mixed layer data. Thus, the classification unit 10 may classify layer data into 2D layer data and 3D layer data (operation S220).

In an exemplary embodiment, a method of determining a data processing amount of the 3D graphic processor 30 may be provided. If a frequency of layer data received by the display controller 40 from the electronic terminal is higher than a predetermined frequency reference value, the data processing amount of the 3D graphic processor 30 may be determined as equal to or higher than a reference value. Otherwise, if the frequency of the received data is lower than the predetermined frequency reference value, the data processing amount of the 3D graphic processor 30 may be determined as lower than the reference value.

In an exemplary embodiment, a method of determining a used system bandwidth of the electronic terminal when direct mixed layer data is transmitted to the display controller 40 may be provided. The used system bandwidth of the electronic terminal may be determined depending on whether a resolution of an image corresponding to layer data that is classifiable as the direct mixed layer data exceeds a predetermined resolution reference value. For example, if the resolution of the image corresponding to the layer data that is classifiable as the direct mixed layer data exceeds the predetermined resolution reference value, the system bandwidth of the electronic terminal needed to transmit layer data, which is classifiable as the direct mixed layer data, to the display controller 40 may be determined as higher than a reference value. Otherwise, if the resolution of the image corresponding to the layer data that is classifiable as the direct mixed layer data does not exceed the predetermined resolution reference value, the system bandwidth of the electronic terminal needed to transmit layer data, which is classifiable as the direct mixed layer data, to the display controller 40 may be determined as equal to or lower than the reference value.

Figure 7:
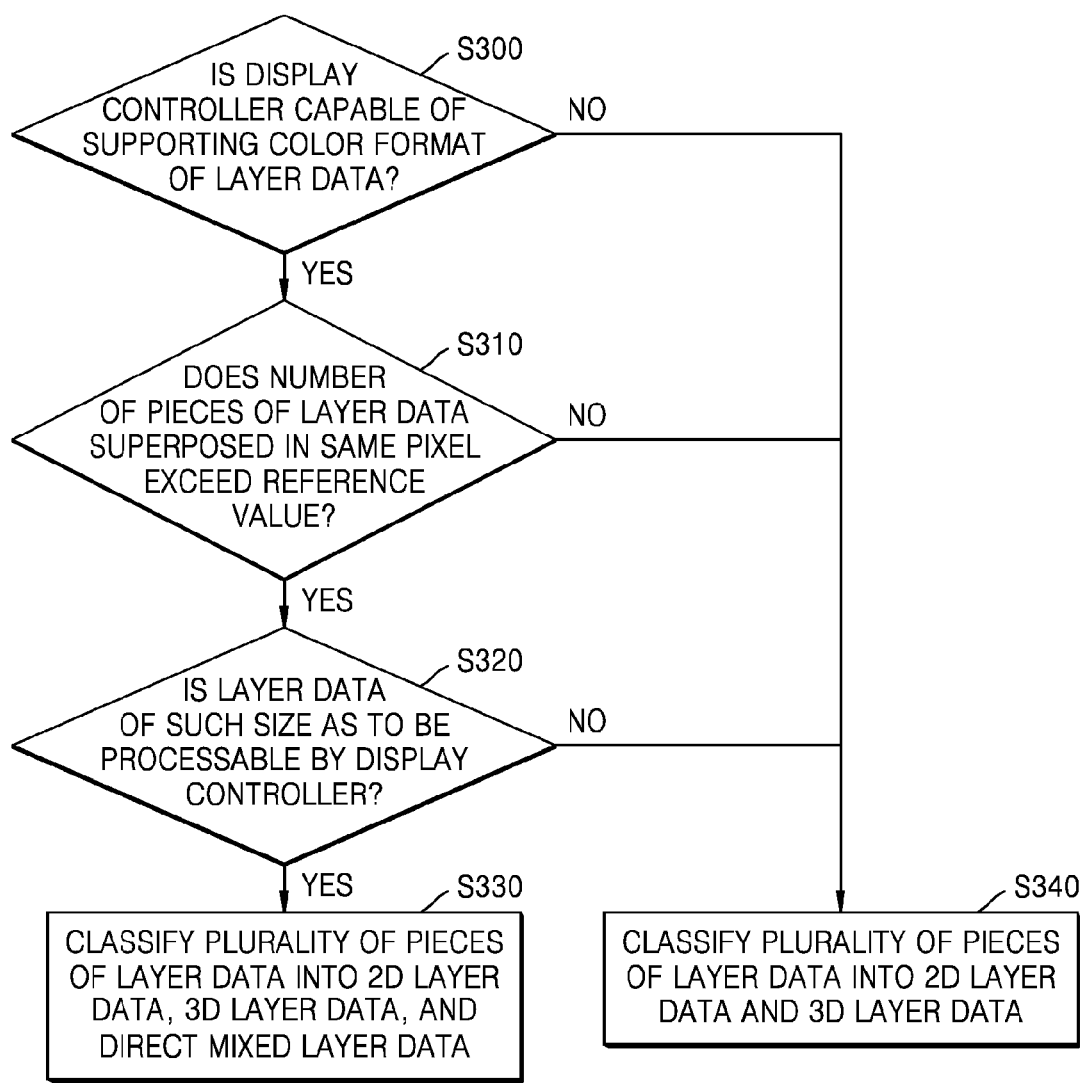
FIG. 7 is a flowchart of a method of determining whether there is layer data that is directly mixable by a display controller, according to an exemplary embodiment.

FIG. 7 is a flowchart of a method of determining whether there is layer data that is classifiable as direct mixed layer data, which is directly mixable by a display controller, according to an exemplary embodiment.

Referring to FIG. 7, initially, to determine whether there is direct mixed layer data, which is directly mixable by the display controller, from among a plurality of pieces of layer data, it may be determined whether there is layer data including a color format that may be supported by the display controller (operation S300). If there is the layer data including the color format, it may be determined whether the number of pieces of layer data superposed in the same pixel, from among the layer data including the color format, exceeds a reference value (S310). If the number of the pieces of layer data superposed in the same pixel does not exceed the reference value, it may be determined whether the layer data including the layer data superposed in the same pixel is of such a size as to be processable by the display controller (operation S320). If the layer data is of such the size as to be processable by the display controller, it may be determined that there is direct mixed layer data, and the plurality of pieces of layer data may be classified into 2D layer data, 3D layer data, and direct mixed layer data (operation S330). Otherwise, if there is no layer data that falls within operations S300 to S330, it may be determined that there is no direct mixed layer data, and the plurality of pieces of layer data may be classified into 2D layer data and 3D layer data (operation S340). However, the inventive concept is not limited to the present embodiment, and operations S300 to S340 may be performed in various orders to determine whether there is direct mixed layer data.

Figure 8:
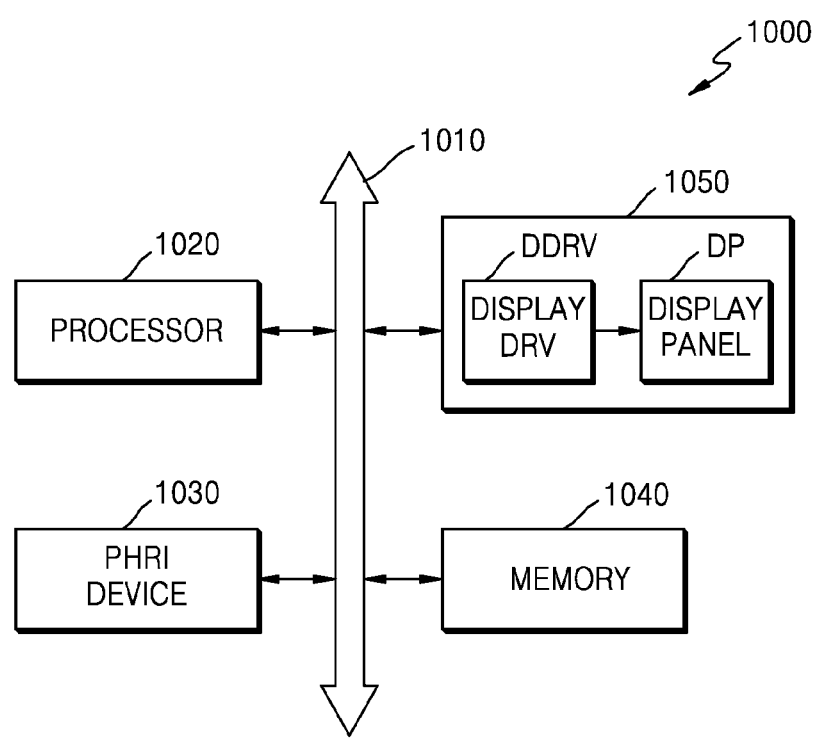
FIG. 8 is a diagram of a display system according to an exemplary embodiment.

FIG. 8 is a diagram of a display system 1000 according to an exemplary embodiment.

Referring to FIG. 8, the display system 1000 may include a processor 1020, a display device 1050, a peripheral device 1030, and a memory 1040, which may be electrically connected to a system bus 1010.

The processor 1020 may control data to be input to or output from the peripheral device 1030, the memory 1040, and the display device 1050 and perform an image processing operation on image data transmitted between the peripheral device 1030, the memory 1040, and the display device 1050. The image data may include layer data described above with reference to FIGS. 1 to 7.

The display device 1050 may include a display panel DP and a display driver apparatus DDRV. The display device 1050 may receive image data through the system bus 1010, store the image data in a frame memory or a line memory included in the display driver apparatus DDRV, and display the image data on the display panel DP. The display driver apparatus DRVC may be the display driver apparatus 1 described with reference to FIGS. 1 and 2 according to exemplary embodiments.

The peripheral device 1030 may be a device configured to convert moving images or still images captured by a camera, a scanner, or a webcam into electric signals. Image data obtained by using the peripheral device 1030 may be stored in the memory 1040 or displayed on the display panel DP of the display device 1050 in real-time. The memory 4040 may include a volatile memory device (e.g., a dynamic random access memory (DRAM)) and/or a non-volatile memory device (e.g., a flash memory). The memory 1040 may include a DRAM, a phase-change RAM (PRAM), a magnetic RAM (MRAM), a resistive RAM (ReRAM), a ferroelectric RAM (FRAM), a NOR flash memory, a NAND flash memory, and/or a fusion flash memory (e.g., a memory in which a static RAM (SRAM) buffer, a NAND flash memory, and a NOR interface logic are combined). The memory 1040 may store image data obtained by the peripheral device 1030 or store image signals processed by the processor 1020.

The display system 1000 according to the exemplary embodiment may be applied to an electronic product, such as a tablet PC or a TV, but the inventive concept is not limited thereto. The display system 1000 may be applied to various kinds of electronic products configured to display images.

Figure 9:
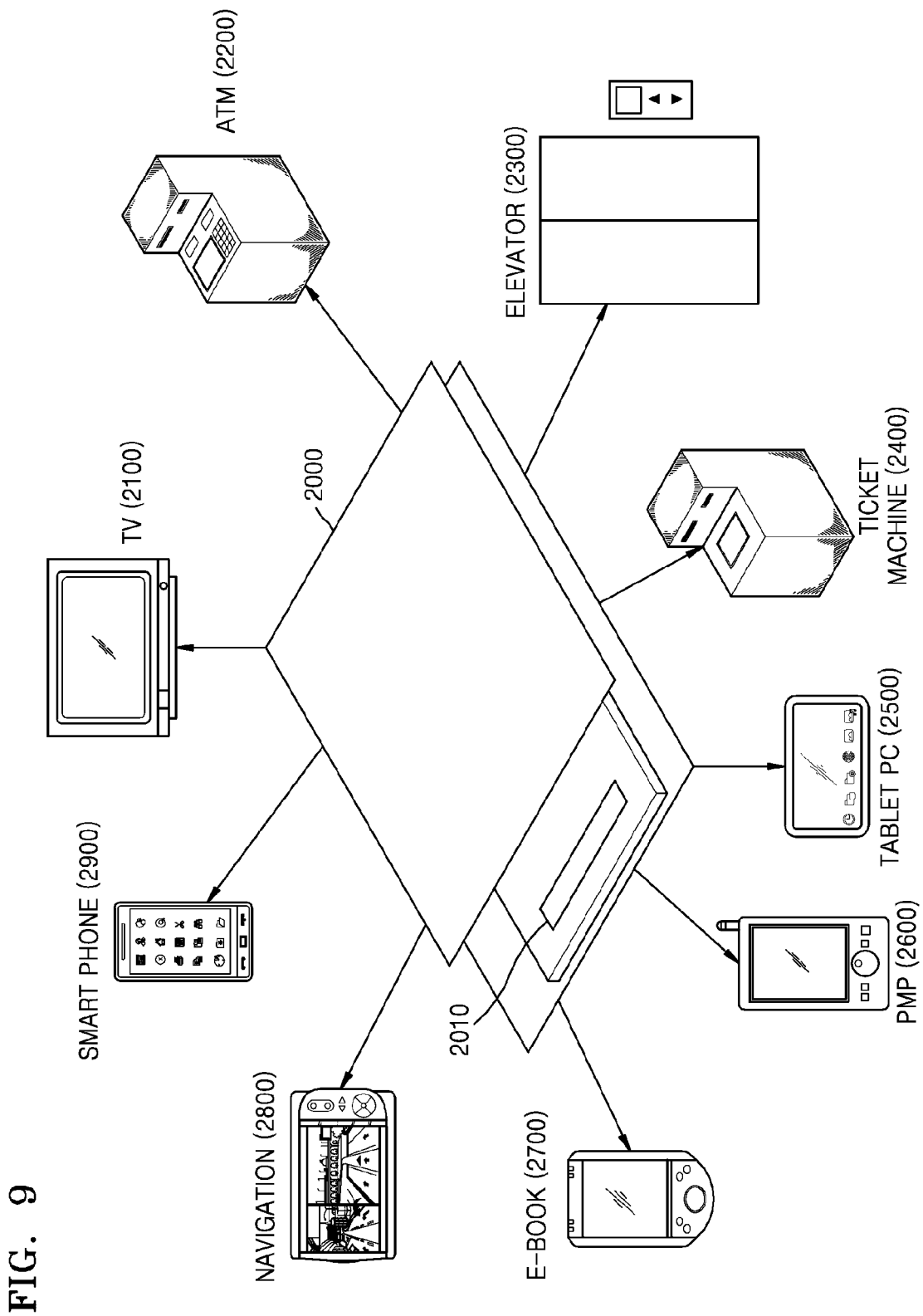
FIG. 9 is a diagram of various application examples of an electronic product on which a display driver apparatus according to an exemplary embodiment is mounted.

FIG. 9 is a diagram of various application examples of an electronic product on which a display driver apparatus 1 according to an exemplary embodiment is mounted.

A display device 2000 according to an exemplary embodiment may include the display driver apparatus 2010 that corresponds to 1 shown in FIG. 1 or 2 and be applied to various electronic products. The display device 2000 may be broadly applied not only to a smartphone 2900 but also to a TV 2100, an automated teller machine (ATM) 2200 configured to perform bank deposits or withdrawals, an elevator 2300, a smart watch 2400, a tablet PC 2500, a portable media player (PMP) 2600, an electronic book (e-book) 2700, and a navigation 2800, etc. The display device 2000 may be mounted on various wearable electronic devices.

An electronic terminal according to an exemplary embodiment may appropriately classify layer data by using a method of driving a display to generate a display interface, and improve display efficiency.

While the inventive concept has been particularly shown and described with reference to exemplary embodiments thereof, it will be understood that various changes in form and details may be made therein without departing from the spirit and scope of the following claims.

What is claimed is:

1. A display driver apparatus comprising:
   a processor configured to receive a plurality of pieces of layer data and classify the received plurality of pieces of layer data into at least one from among two-dimensional (2D) layer data, three-dimensional (3D) layer data, and direct mixed layer data;
   a 2D graphic processor configured to receive the 2D layer data transmitted from the processor and process the 2D layer data;
   a 3D graphic processor configured to receive the 3D layer data transmitted from the processor and process the 3D layer data; and
   a display controller configured to:
      receive the direct mixed layer data from the processor;
      receive the processed 2D layer data from the 2D graphic processor;
      receive the processed 3D layer data from the 3D graphic processor, and
      mix the direct mixed layer data, the processed 2D layer data, and the processed 3D layer data to generate a display interface for a display device,
   wherein the processor is further configured to:
      determine whether layer data, which is classifiable as the direct mixed layer data, is present in the received plurality of pieces of layer data,
      in response to determining that the layer data, which is classifiable as the direct mixed layer data, is present, classify the received plurality of pieces of layer data into at least one from among the 2D layer data, the 3D layer data, and the direct mixed layer data, and
      in response to determining that the layer data, which is classifiable as the direct mixed layer data, is not present, classify the received plurality of pieces of layer data into at least one from among the 2D layer data and the 3D layer data.

2. The display driver apparatus of claim 1, wherein the processor classifies the received plurality of pieces of layer data into the 2D layer data, the 3D layer data, and the direct mixed layer data according to characteristics of the received plurality of pieces of layer data.

3. The display driver apparatus of claim 2, wherein based on the characteristics of the received plurality of pieces of layer data, the processor classifies layer data processed by the 2D graphic processor, from among the received plurality of pieces of layer data, as the 2D layer data, and classifies layer data processed by the 3D graphic processor, from among the received plurality of pieces of layer data, as the 3D layer data.

4. The display driver apparatus of claim 1, wherein, based on indication information included in the received plurality of pieces of layer data and characteristics of the received plurality of pieces of layer data, the processor classifies the received plurality of pieces of layer data into at least one of the 2D layer data, the 3D layer data, and the direct mixed layer data.

5. The display driver apparatus of claim 4, wherein layer data from among the received plurality of pieces of layer data including the indication information is classified as the 3D layer data by the processor.

6. The display driver apparatus of claim 1, wherein the 2D layer data comprises video layer data, and
   at least one from among a color format conversion operation, a scaling operation, a rotation operation, and a cropping operation is performed on the video layer data by the 2D graphic processor.

7. The display driver apparatus of claim 1, wherein the 3D layer data is layer data that is not directly mixed by the display controller from among the received plurality of pieces of layer data other than the 2D layer data.

8. The display driver apparatus of claim 7, wherein the processor does not classify layer data corresponding to at least one from among layer data including a color format that is not supported by the display controller, layer data including data in which a number of pieces of data superposed in a same pixel exceeds a reference value, layer data having such a data size as not to be processed by the display controller, and layer data that is not mixed due to performance of the display controller, as the direct mixed layer data.

9. A method of driving a display, the method comprising:
   receiving a plurality of pieces of layer data;
   classifying, by a classifier, the received plurality of pieces of layer data into at least one from among 2D layer data, 3D layer data, and direct mixed layer data;
   processing, by a 2D processor, the 2D layer data;
   processing, by a 3D processor, the 3D layer data; and
   mixing, by a display controller, the direct mixed layer data, the processed 2D layer data, and the processed 3D layer data to generate a display interface for a display device,
   wherein the classifying the received plurality of pieces of layer data comprises determining whether layer data, which is classifiable as the direct mixed layer data, is present in the received plurality of pieces of layer data, wherein, in response to determining that the layer data, which is classifiable as the direct mixed layer data, is present, the received plurality of pieces of layer data are classified into at least one from among the 2D layer data, the 3D layer data, and the direct mixed layer data, and wherein, in response to determining that the layer data, which is classifiable as the direct mixed layer data, is not present, the received plurality of pieces of layer data are classified into at least one from among the 2D layer data and the 3D layer data.

10. A display driver apparatus comprising:

a processor configured to classify a plurality of pieces of layer data into at least one from among two-dimensional (2D) layer data, three-dimensional (3D) layer data, and direct mixed layer data;

a 2D graphic processor configured to receive the 2D layer data transmitted from the processor, process the 2D layer data, and output processed 2D layer data;

a 3D graphic processor configured to receive the 3D layer data transmitted from the processor, process the 3D layer data, and output processed 3D layer data; and a display controller configured to mix the direct mixed layer data, the processed 2D layer data, and the processed 3D layer data to generate a display interface for a display device, wherein the processor is further configured to:
determine whether layer data, which is classifiable as the direct mixed layer data, is present in the plurality of pieces of layer data, in response to determining that the layer data, which is classifiable as the direct mixed layer data, is present, classify the plurality of pieces of layer data into at least one from among the 2D layer data, the 3D layer data, and the direct mixed layer data, and in response to determining that the layer data, which is classifiable as the direct mixed layer data, is not present, classify the plurality of pieces of layer data into at least one from among the 2D layer data and the 3D layer data.

11. The display driver apparatus of claim 10, wherein the 2D layer data comprises video layer data, and wherein the 2D graphic processor performs at least one from among a color format conversion operation, a scaling operation, a rotation operation, and a cropping operation on the video layer data.

* * * * *